United States Patent
Wyatt et al.

(10) Patent No.: US 8,494,750 B2
(45) Date of Patent: Jul. 23, 2013

(54) ENGINE CONTROL SYSTEM

(75) Inventors: Andrew Richard Wyatt, Castle Hill (AU); Cory Urquhart, Port Macquarie (AU)

(73) Assignee: Adaptronic Electronics Pty Ltd, Castle Hill (AU)

(*) Notice: Subject to any disclaimer, the term of this patent is extended or adjusted under 35 U.S.C. 154(b) by 500 days.

(21) Appl. No.: 12/675,091

(22) PCT Filed: Jul. 16, 2008

(86) PCT No.: PCT/AU2008/001031
§ 371 (c)(1),
(2), (4) Date: Feb. 24, 2010

(87) PCT Pub. No.: WO2009/023895
PCT Pub. Date: Feb. 26, 2009

(65) Prior Publication Data
US 2010/0204898 A1    Aug. 12, 2010

(30) Foreign Application Priority Data
Aug. 23, 2007 (AU) .................. 2007904568

(51) Int. Cl.
*G06F 19/00* (2011.01)
*F02M 51/00* (2006.01)

(52) U.S. Cl.
USPC ........................................ 701/102; 123/480

(58) Field of Classification Search
USPC ................. 123/102, 103, 110, 115, 478, 480, 123/486
See application file for complete search history.

(56) References Cited

U.S. PATENT DOCUMENTS

| | | | |
|---|---|---|---|
| 5,056,026 A | 10/1991 | Mitchell et al. | |
| 5,803,043 A * | 9/1998 | Bayron et al. | 123/335 |
| 6,304,814 B1 | 10/2001 | Masters et al. | |
| 7,040,286 B2 | 5/2006 | Campbell | |
| 2002/0138158 A1 | 9/2002 | Landreth | |
| 2004/0172188 A1 * | 9/2004 | Bowling et al. | 701/102 |

FOREIGN PATENT DOCUMENTS

FR    2 882 972 A1    9/2006

OTHER PUBLICATIONS

International Search Report dated Aug. 28, 2008 from corresponding international application No. PCT/AU2008/001031, 2 pages.

* cited by examiner

*Primary Examiner* — Mahmoud Gimie
(74) *Attorney, Agent, or Firm* — Maier & Maier PLLC

(57) ABSTRACT

This disclosure relates to a method of configuring an engine control system for controlling the engine of a vehicle. The method involves displaying one or more graphical representations of functional elements to be performed by the engine control system and then modifying the one or more functional elements by making changes to the displayed graphical representations. This allows the engine control system to be readily reconfigured by a user. This disclosure also relates to an apparatus for configuring an engine control system and a new engine control system. A computer program product including a computer readable medium having a computer program recorded on it for configuring an engine control system is also disclosed.

12 Claims, 4 Drawing Sheets

ENGINE CONTROL SYSTEM

RELATED APPLICATIONS

This application claims priority, under 35 U.S.C. §119, to international patent application No.: PCT/AU2008/001031, filed on Jul. 16, 2008, which claims priority to Australian patent application No.: 2007904568, filed Aug. 23, 2007, the disclosures of which are incorporated by reference herein in its entirety.

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

FIELD OF THE INVENTION

The present invention relates generally to engine control systems for controlling the engine of a vehicle and, in particular, to a method and apparatus for configuring an engine control system. The present invention also relates to a computer program product including a computer readable medium having recorded thereon a computer program for configuring an engine control system.

BACKGROUND

The term "engine control system" as used herein refers to an electronic system which controls various operational aspects of an internal combustion engine. Such an engine control system may also be referred to as an engine control unit (ECU), an engine control module (ECM) or an engine management system (EMS). An engine control system may also be referred to as a powertrain control unit/module (PCU, PCM) if the system controls both an engine and a transmission.

Prior to engine control systems, most engine parameters were fixed. For example, the quantity of fuel injected into each cylinder of an engine on each engine cycle was determined by a carburetor. Early engine control systems were then used to control this quantity of fuel. However, engine control systems found in many current generation passenger vehicles may also be used to control ignition timing, variable valve timing (VVT), the level of boost maintained by a turbocharger, for example. Engine control systems control these parameters by monitoring the engine using sensors connected onto or around the engine. These sensors can include, for example, manifold absolute pressure (MAP) sensors, throttle position sensors, thermistor type temperature sensors, air temperature sensors, oxygen sensors and many others.

One special category of engine control systems are known as "aftermarket" engine control systems. Aftermarket engine control systems may be programmed by an installer or end user to modify one or more control parameter settings (or calibration constants) for controlling the engine of a vehicle. Such programmable aftermarket engine control systems may be used where significant aftermarket modifications have been made to the engine of a vehicle. For example, an aftermarket engine control system may be used where a user is adding or changing an intercooler, adding or changing a turbocharger, or changing the exhaust system of the vehicle. In such instances, an existing engine control system may not provide appropriate control for the configuration of the modified engine and thus, an aftermarket engine control system is required.

However, conventional aftermarket engine control systems are typically pre-programmed for a particular engine and the user is generally only able to configure the engine control system by modifying one or more specified parameter settings. Further, these parameter settings are generally presented to the user in a table format which the user must modify and then upload as software to the engine control system. As well as being limited in its use, such a configuration method is often counter intuitive and difficult to perform for some users.

Thus an improved engine control system which may be more easily and efficiently configured is clearly needed.

SUMMARY

It is an object of the present invention to substantially overcome, or at least ameliorate, one or more disadvantages of existing arrangements.

According to a first aspect of the present invention, a method of configuring an engine control system is provided for use in controlling the engine of a vehicle, said method comprising:

displaying one or more graphical representations of functional elements each defining one or more arithmetic or logical operations to be performed by said engine control system; and modifying one or more of the functional elements by making changes to the displayed graphical representations in order to configure the engine control system.

Preferably, the modifications are made during continuous operation of the engine.

Preferably, the modifications include changing connections between the graphical representations.

Preferably, the modifications include assigning one or more inputs and outputs of the engine control system to one or more of the graphical representations.

Preferably, the modifications include changing links between the functional elements.

Preferably, the method further comprises the step of simulating operation of the engine control system based on pre-stored engine data.

Preferably, the engine control system provides audio queues to a user during the modification of the functional elements.

Preferably, the engine control system provides audio feedback of as to a current state of engine behaviour.

Preferably, the audio feedback represents knocking sounds generated by the engine of the vehicle.

Preferably, the functional elements include one or more of the following:
  (i) a single dimensional tables with interpolated outputs;
  (ii) a two dimensional tables with interpolated outputs;
  (iii) a summer;
  (iv) a multiplier;
  (v) a divider;
  (vi) a splitter;
  (vii) a saturator;
  (viii) a comparator;
  (ix) a multiplexer;
  (x) a timer;
  (xi) a latch;
  (xii) a delay line;
  (xiii) a logical operation with arbitrary inversion;
  (xiv) a proportional-integral-derivative controller;
  (xv) a display; and
  (xvi) a gauge.

According to a second aspect of the present invention, an apparatus is provided for configuring an engine control system for use in controlling the engine of a vehicle, said method comprising:

display for displaying one or more graphical representations of functional elements each defining one or more arithmetic or logical operations to be performed by said engine control system; and processor for modifying one or more of the functional elements by making changes to the displayed graphical representations in order to configure the engine control system.

According to a third aspect of the present invention, a computer readable medium is provided, having a program recorded thereon, where the program is configured to make a computer execute a procedure to configure an engine control system for use in controlling the engine of a vehicle, said program comprising:

code for displaying one or more graphical representations of functional elements each defining one or more arithmetic or logical operations to be performed by said engine control system; and code for modifying one or more of the functional elements by making changes to the displayed graphical representations in order to configure the engine control system.

According to a fourth aspect of the present invention, an engine control system is provided and is configured in accordance with the method of any one of the above paragraphs.

According to a fifth aspect of the present invention, an engine control system is provided for controlling the engine of a vehicle, said engine control system comprising:

memory for storing one or more functional elements each defining one or more arithmetic or logical operations to be performed by said engine control system; and processor for executing the one or more functional elements to control the engine, wherein the functional elements are modifiable by making changes to one or more displayed graphical representations of the functional elements while the engine is operating.

Other aspects of the invention are also disclosed.

BRIEF DESCRIPTION OF THE DRAWINGS

One or more embodiments of the present invention will now be described with reference to the drawings and appendices, in which.

DETAILED DESCRIPTION INCLUDING BEST MODE

Figure 1:
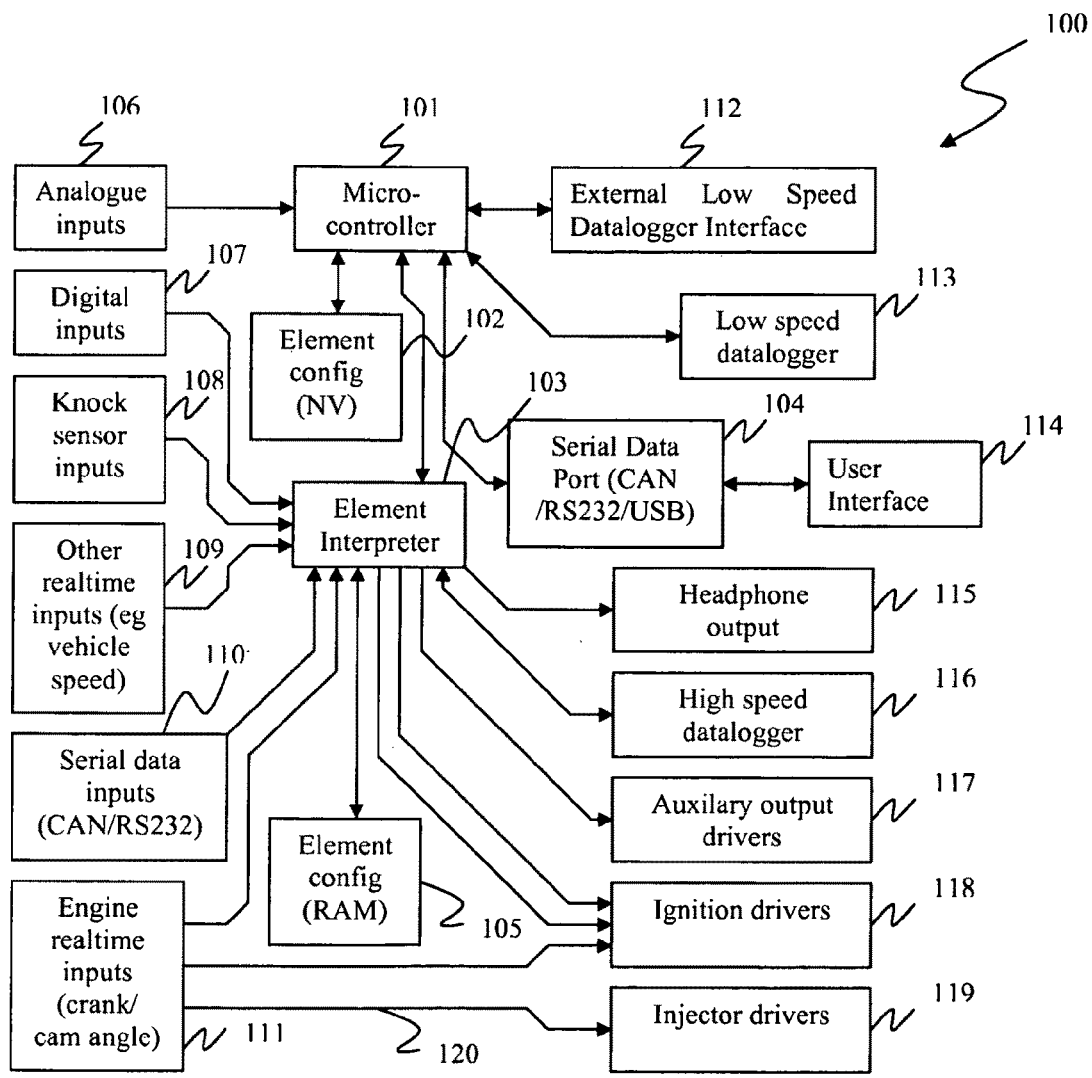
FIG. 1 is a schematic block diagram of a configurable engine control system according to one embodiment.

Where reference is made in any one or more of the accompanying drawings to steps and/or features, which have the same reference numerals, those steps and/or features have for the purposes of this description the same function(s) or operation(s), unless the contrary intention appears.

FIG. 1 is a schematic block diagram of a configurable engine control system 100 according to one embodiment. The engine control system 100 may be implemented in the form of an aftermarket engine control unit (ECU).

Various functions performed by the engine control system 100 and which will be described below, may be implemented as software, such as one or more programs executable within the system 100. Alternatively, the various functions performed by the engine control system 100 may be implemented in hardware, such as an application specific integrated circuit (ASIC) or a field programmable gate array (FPGA) within the system 100.

The steps of the functions are effected by instructions in the software that are executed within the system 100. Alternatively, the steps of the functions are effected in a custom logic design of an FPGA within the system 100. The software or logic design may be stored in a computer readable medium, including the storage devices described below, for example. The software is loaded into the system 100 from the computer readable medium, and is then executed by the system 100. A computer readable medium having such software or computer program recorded on it is a computer program product.

The functions of the system 100 are implemented using "functional elements". Each of the functional elements defines one or more arithmetic or logical operations that may be performed by the system 100. The arithmetic or logical operations include single or two-dimensional table interpolation, timing, latching, saturation and multiplication, which are performed by the system 100 in order to affect the behaviour of an engine that the system 100 is controlling. Each of the functional elements may be formed as one or more programmable logic or software code modules defining the corresponding arithmetic or logical operations. Again, the programmable logic or software code modules defining the functional elements may be stored in a computer readable medium, including the storage devices described below, for example. The programmable logic and/or software code modules may also be loaded into the engine control system 100 from the computer readable medium.

The engine control system 100 may be configured by modifying one or more of the functional elements. In particular, the arrangement of the functional elements including the combination and connection of the functional elements may be modified to modify the operation of the system 100 and thus, the behaviour of the engine being controlled. The connection of the functional elements may be made by changing the connections between the graphical representations of the functional elements using a user interface 114. The flow of data within the system 100, calibration constants and calculations performed by the system 100 may all be modified by modifying the functional elements.

Several different types of functional elements are listed as follows:

single dimensional tables with interpolated outputs;
two dimensional tables with interpolated outputs;
summer with ability to negate inputs to perform a subtraction;
multiplier/divider;
splitter/saturator;
comparator;
multiplexer which selects one of two inputs based on a third input;
timer;
latch;
delay line;
logical operation based on an arbitrary truth table;
logical operation with arbitrary inversion;
proportional-integral-derivative (PID) controller;
display; and
gauge.

The engine control system 100 comprises a microcontroller 101 (or processor), a non-volatile memory unit 102 formed from semiconductor read only memory (ROM) for storing data representing a configuration of the functional elements (or "element configuration") and a random access memory (RAM) unit 105 for caching that data and storing temporary calculations.

The system 100 also comprises a number of inputs and outputs including analogue inputs 106, digital inputs 107, knock sensor inputs 108, real time inputs 109, serial data inputs (CAN/RS232) 110, engine real time inputs 111, a serial data port (CAN/RS232/USB) 104, headphone outputs 115 and auxiliary output drivers 117. The serial data port 104 affords serial connectivity and is preferably implemented according to the Universal Serial Bus (USB) standards having a, corresponding USB connector. The system 100 may couple to a user interface 114 via the serial data port 104.

The system 100 also comprises an element interpreter 103, a low speed data-logger 113, an external low speed data logger interface 112, a high speed data logger 116, ignition drivers 118 and injector drivers 119.

The components 101 to 113 of the system 100 typically communicate via a plurality of buses (e.g., 120).

Typically, the element configuration discussed above is resident on the non-volatile memory unit 102 of the engine control system 100 and is read and controlled in execution by the element interpreter 103. Additionally, some support functions such as data acquisition and communications interfacing are provided by the microcontroller 101. Intermediate storage of the element configuration may be accomplished using the memory unit 105. Additionally, firmware governing the engine control system 100 is stored in the microcontroller 101 and the element interpreter 103. In some instances, either the firmware or the element configuration may be supplied to the user encoded on one or more CD-ROM and be read via a corresponding drive 212 (see FIG. 2) of the user interface 114, or alternatively may be read from the networks 220 or 222 (see FIG. 2). Still further, the firmware and element configuration can also be loaded into the system 100 from other computer readable media. Computer readable media refers to any storage medium that participates in providing instructions and/or data to the system 100 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether of not such devices are internal or external of the system 100. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The analogue inputs 106 are connected to sensors (not shown) which are used for measuring one or more parameters of the engine during operation of the engine. The output of the sensors is in the form of a variable voltage signal which may be generated using a variable resistance. The analogue inputs 106 may be implemented as biasing components for variable resistance sensors such as thermistor type temperature sensors. These biasing components may be disabled or enabled by the microcontroller 101.

The signals received on the analogue inputs 106 are multiplexed by a multiplexer into a high speed, single 12-bit analogue successive approximation analogue to digital converter (ADC) configured within the microcontroller 101.

One of several filter functions may be selected for each of the analogue inputs 106. The event interpreter 103 performs these filtering functions on the signals received on the analogue inputs 106. Alternatively, the microcontroller 101 performs the filtering of the signals received on the analogue inputs 106.

The microcontroller 101 performs the analogue to digital conversion of the signals received on the analogue inputs 106 and passes values generated by the analogue to digital converter to the element interpreter 103. The microcontroller 101 also passes communications between the serial data port 104 and the element interpreter 103.

Communications between the serial data port 104 and the non-volatile memory 102 are also controlled by the microcontroller 101 allowing the user interface 114 to be used to read and modify the functional elements as will be described in detail below.

The microcontroller 101 also passes communications between the memory unit 102 and the RAM 105, via the element interpreter 103, and passes data from the element interpreter 103 to the low speed data logger 113 and the low speed data logger interface 112.

Alternatively, the microcontroller 101 may be omitted from the system 100 and the functions performed by the microcontroller 101 may be performed by the element interpreter 103.

The configuration of the functional elements may include modifying symbolic links between the individual functional elements and between the functional elements and special inputs and outputs. Data representing the configuration of the functional elements is preferably stored in a non-volatile memory unit 102, for example, in the form of a dedicated electrically-erasable programmable read-only memory (EEPROM) integrated circuit, so that details of the configuration are retained when power to the engine control system 100 is lost. Alternatively, the non-volatile memory unit 102 may be in the form of a battery-backed up static random access memory (RAM) unit. In another embodiment, the non-volative memory unit 102 may be shared with the low speed datalogger 113.

Data representing the configuration of the functional elements is cached into the high speed random access memory (RAM) 105 to allow the element interpreter 103 to interpret the functional elements at a predetermined rate. When the configuration of the functional elements is changed by a user using the user interface 114, data representing the configuration is updated in the memory 102 and the RAM 105. Alternatively, the configuration of the elements may be read directly out of the memory 102.

The engine control system 100 of FIG. 1 comprises eight (8) digital inputs 107 which are used as inputs to the element interpreter 103. Individual functional elements can use signals received by the digital inputs 107 as inputs to the elements. Alternative arrangements may include no such digital inputs, or the digital inputs may be read through the microcontroller 101.

The engine control system 100 of FIG. 1 comprises at least two independent knock sensor inputs 108 each with a sample rate exceeding 40 kHz. The inputs 108 may be used to input any knock signals generated by the engine. Such knock signals have a typical centre frequency of around seven (7) kHz. The knock signals may be multiplied by a gain vector in the engine angle domain. This allows increased sensitivity at crank angles at which knock is more likely to occur and decreased sensitivity at crank angles at which mechanical noise from the engine generates noise in the knock signal. The multiplied knock signals are then bandpass filtered and rectified to arrive at a peak amplitude. A lowpass filtered version of the same knock signal is subtracted from the peak amplitude to remove stationary signals. The resultant signal of this subtraction can then be modified by subtracting another vector in the engine speed domain, or subtracting an offset based on engine speed and engine load. In this embodiment, the bandpass filtering is performed using a fast Fourier transform (FFT). Advantageously, this allows a user to view the spectral components of the signal, so that they can determine what the cutoff frequencies should be.

The engine realtime inputs 111 are used for receiving signals representing engine positional information. These signals may come from sensors (e.g., a Hall effect sensor, optical sensor or variable reluctance sensor) on the crankshaft of the engine or one of several camshafts contained within the engine. There are five realtime inputs 111, in the system 100 of FIG. 1, which allow for one crankshaft and up to four camshafts. Each of the realtime inputs 111 may accept a digital input or an input from a variable reluctance sensor. For a digital input, the engine control system 100 can be sensitive to a rising edge or a falling edge of the signal, or both. Each of the realtime inputs 111 can be individually configured to receive crankshaft positional incremental information. For example, the crankshaft may comprise a multitooth trigger on the crankshaft, where each tooth is spaced at a specified angular spacing. In one example, each tooth may be spaced at regular thirty degree intervals.

Each of the realtime inputs 111 can also be individually configured to receive absolute positional information (e.g., a single tooth on a camshaft sensor). Further, each of the realtime inputs 111 can be individually configured to receive incremental information with one or more missing signals to signal absolute information (e.g., a crankshaft sensor with one or more missing trigger teeth). Still further, each of the realtime inputs 111 can be individually configured to receive signals indicating camshaft angle.

Signals received on the realtime inputs 111 are interpreted by the element interpreter 103 so that the element interpreter 103 may determine a calculated value representing the crank position of the engine at all times. This calculated value may be used by the ignition driver outputs 118, the injector driver outputs 119, camshaft position sensing and for knock sensing. The element interpreter 103 allows for variable amounts of filtering to be applied to the engine inputs to allow the user to trade off bandwidth against noise immunity.

The other realtime inputs 109 are similar to the engine realtime inputs 111. However, the other realtime inputs 109 are used to receive frequency information, rather than phase information. The realtime inputs 109 comprise four inputs and may also be used to receive analogue signals representing wheel speed.

In common with the engine realtime inputs 111, the other realtime inputs 109 can be selected to accept variable reluctance or digital signals, and have variable filter time constants for selection of bandwidth and noise immunity.

The serial data inputs 110 of the engine control system 100 can be used to connect the engine control system 100 to several separate sensors with serial data outputs. The serial data inputs 110 may be used for the connecting of a wideband oxygen sensor, for use in closed loop fuel control, to the serial data inputs 110. The serial data inputs 110 preferably comprise two serial connectors that allow direct connection to such devices. The element interpreter 103 sends polling commands to a device, such as a wideband exhaust gas oxygen sensor connected to the serial data inputs 110, and captures the serial data received from the device. A packet returned from such a device is validated by the element interpreter 103 and is interpreted to achieve the output value, or values, required. These values can then be used by other elements within the engine control system 100. Alternatively, the packet validation and interpretation may be performed by the microcontroller 101.

As described above, the engine control system 100 may be configured by modifying one or more of the functional elements. The behaviour of the engine control system 100 is implemented in the functional elements. Each of the functional elements defines one or more arithmetic or logical operations. The configuration of the functional elements specifies the behaviour of the engine control system 100 in terms of its arithmetic and logic. Data representing the configuration of the functional elements is stored in the non-volatile memory unit 102. The element interpreter 103 iterates through the stored functional elements and determines the output of each functional element based on input values to the functional elements and any internal states.

Each input for each of the functional elements may be one of the following:
 any output of any other element;
 a constant value; and
 an output of an input such as engine triggers, realtime triggers, the digital inputs 107, the analogue inputs 106, the serial data inputs 110 or the knock sensor inputs 108.

The element interpreter 103 of FIG. 1 may be implemented using a field programmable gate array (FPGA). Alternatively, the element interpreter 103 may be implemented using a high speed microcontroller or microprocessor, or even an application specific integrated circuit (ASIC). In still another alternative, the engine control system 100 may interpret a script that defines the arithmetic and logic of the engine control system 100. The interpretation of this script may again be implemented using an FPGA, microcontroller, microprocessor or an ASIC. In still another alternative, a compiler executing within the user interface 114 may generate a directly executable software program, based on the configuration of functional elements specified using the user interface 114, to be executed by the engine control system 100.

The element interpreter 103 iterates through the elements in a predetermined order using an iterator implemented in the element interpreter 103, calculating the internal states and any output values of each functional element at each iterative step: These output values can be sent to dedicated outputs including the ignition drivers 1118, injector drivers 119, auxiliary output drivers 117 and the high speed datalogger 116. The output values can also be read by the microcontroller 101 and then be fed to the low speed datalogger 113 and the low speed datalogger interface 112.

Figure 2:
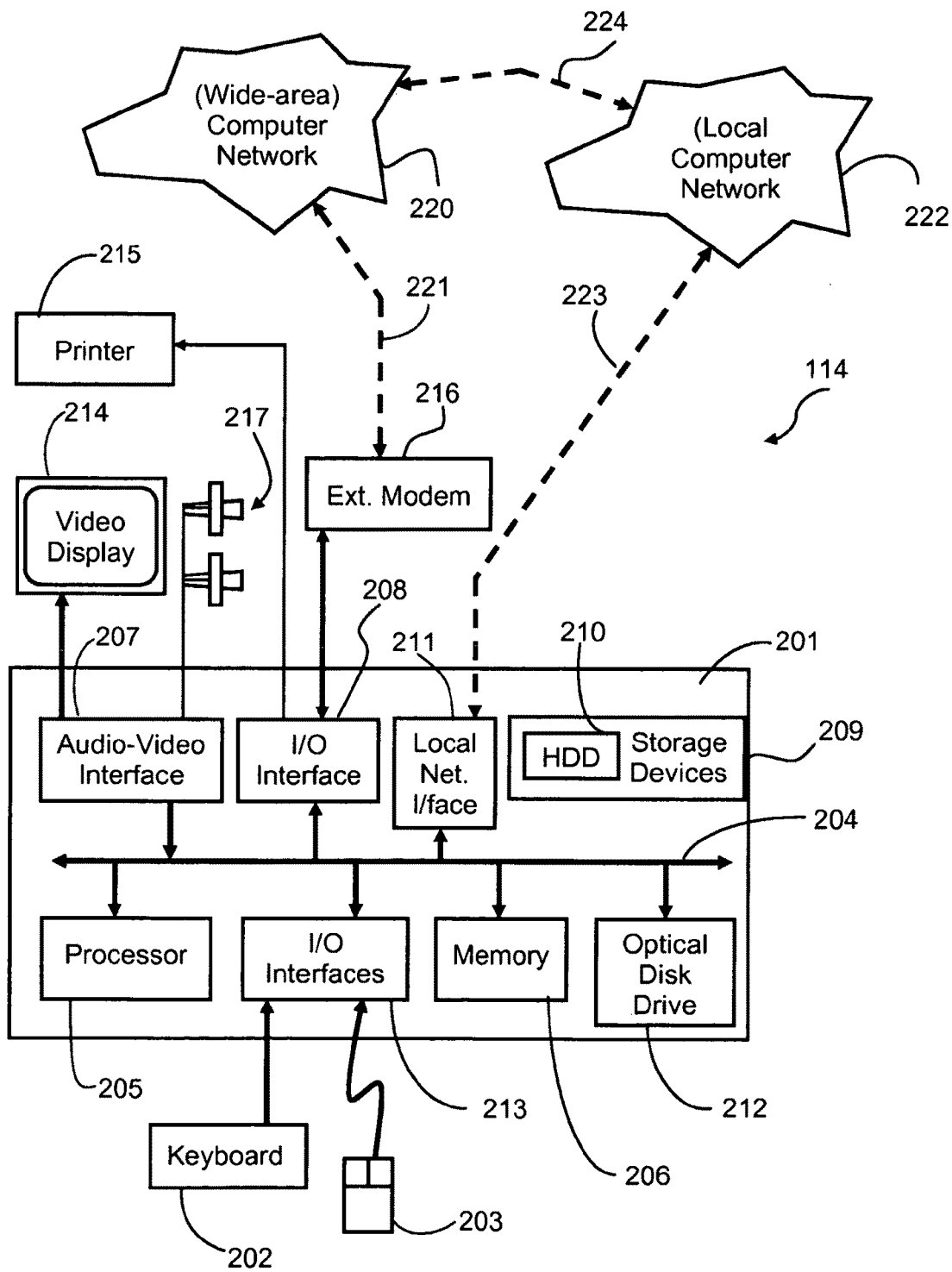
FIG. 2 is a schematic block diagram of a general purpose computer upon which a user interface of the system of FIG. 1 can be practiced.
Figure 3:
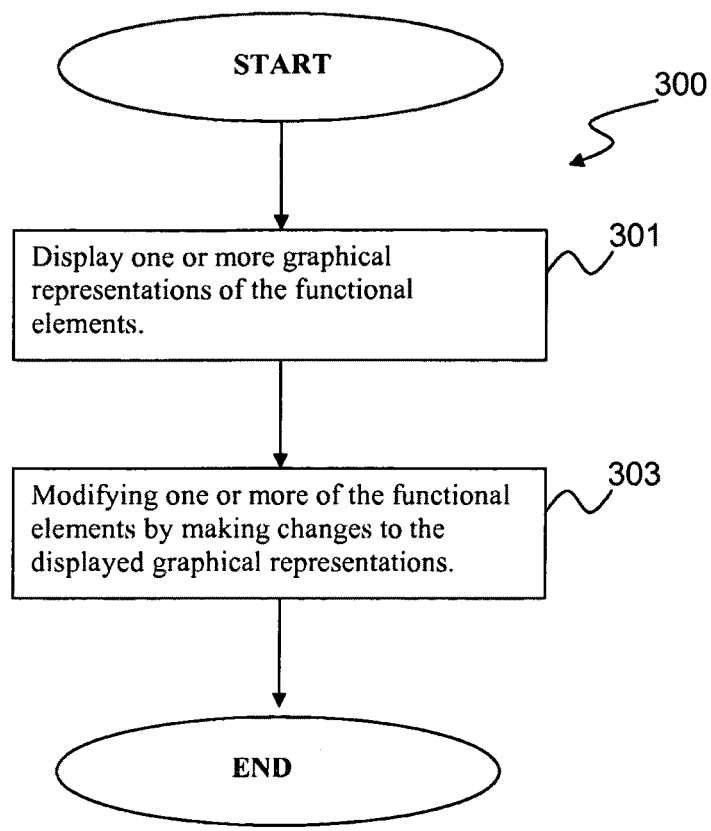
FIG. 3 is a flow diagram showing a method of configuring the engine control system of FIG. 1.

The user interface 114 is implemented using a portable computer system (e.g., a Laptop), such as that shown in FIG. 2. In alternative arrangements, the user interface 114 may be implemented using a general purpose desktop computer system. In still another alternative, the user interface 114 may be implemented in dedicated hardware such as one or more integrated circuits permanently connected to the engine control system 100. Such dedicated hardware may include graphic processors, digital signal processors, or one or more microprocessors and associated memories.

Various functions of the user interface 114, which will be described below, may be implemented as software, such as one or more application programs executable within the user interface 114. In particular, the functions of the user interface 114 described below may be effected by instructions in the software that are carried out within the user interface 114. The instructions may be formed as one or more code modules, each for performing one or more particular tasks. The software may be stored in a computer readable medium. The software is loaded into the user interface 114 from the computer readable medium, and is then executed by the user interface 114.

As seen in FIG. 2, the user interface 114 is formed by a computer module 201, input devices such as a keyboard 202 and a mouse pointer device 203, and output devices including a printer 215, a display device 214 and loudspeakers 217. An external Modulator-Demodulator (Modem) transceiver device 216 may be used by the computer module 201 for communicating to and from a communications network 220 via a connection 221. The network 220 may be a wide-area network (WAN), such as the Internet or a private WAN. Where the connection 221 is a telephone line, the modem 216 may be a traditional "dial-up" modem. Alternatively, where the connection 221 is a high capacity (e.g.: cable) connection, the modem 216 may be a broadband modem. A wireless modem may also be used for wireless connection to the network 220.

The computer module 201 typically includes at least one processor unit 205, and a memory unit 206 for example formed from semiconductor random access memory (RAM) and read only memory (ROM). The module 201 also includes a number of input/output (I/O) interfaces including an audio-video interface 207 that couples to the video display 214 and loudspeakers 217, an I/O interface 213 for the keyboard 202 and mouse 203, and an interface 208 for the external modem 216 and printer 215. In some implementations, the modem 216 may be incorporated within the computer module 201, for example within the interface 208.

The interface 208 is connected to the serial data port 104, via a connection 225, allowing the user interface 114 to be used to read and modify the functional elements.

The computer module 201 also has a local network interface 211 which, via a connection 223, permits coupling of the computer system 200 to a local computer network 222, known as a Local Area Network (LAN). As also illustrated, the local network 222 may also couple to the wide network 220 via a connection 224, which would typically include a so-called "firewall" device or similar functionality. The interface 211 may be formed by an Ethernet™ circuit card, a wireless Bluetooth™ or an IEEE 802.11 wireless arrangement.

The interfaces 208 and 213 may afford both serial and parallel connectivity, the former typically being implemented according to the Universal Serial Bus (USB) standards and having corresponding USB connectors (not illustrated). Storage devices 209 are provided and typically include a hard disk drive (HDD) 210. Other devices such as a floppy disk drive and a magnetic tape drive (not illustrated) may also be used. An optical disk drive 212 is typically provided to act as a non-volatile source of data. Portable memory devices, such optical disks (e.g.: CD-ROM, DVD), USB-RAM, and floppy disks for example may then be used as appropriate sources of data to the system 100.

The components 205 to 213 of the computer module 201 typically communicate via an interconnected bus 204. Examples of computers on which the user interface 114 can be practised include IBM-PC's and compatibles, Sun Sparc-stations, Apple Mac™ or alike computer systems evolved therefrom.

Typically, the user interface application programs are resident on the hard disk drive 210 and are read and controlled in their execution by the processor 205. Intermediate storage of such programs and any data fetched from the networks 220, 222 and the engine control system 100 may be accomplished using the semiconductor memory 206, possibly in concert with the hard disk drive 210. In some instances, the application programs may be supplied to the user encoded on one or more CD-ROM and read via the corresponding drive 212, or alternatively may be read by the user from the networks 220 or 222. Still further, the software can also be loaded into the computer system 200 from other computer readable media. Computer readable media refers to any storage medium that participates in providing instructions and/or data to the computer system 200 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 201. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

Figure 4:
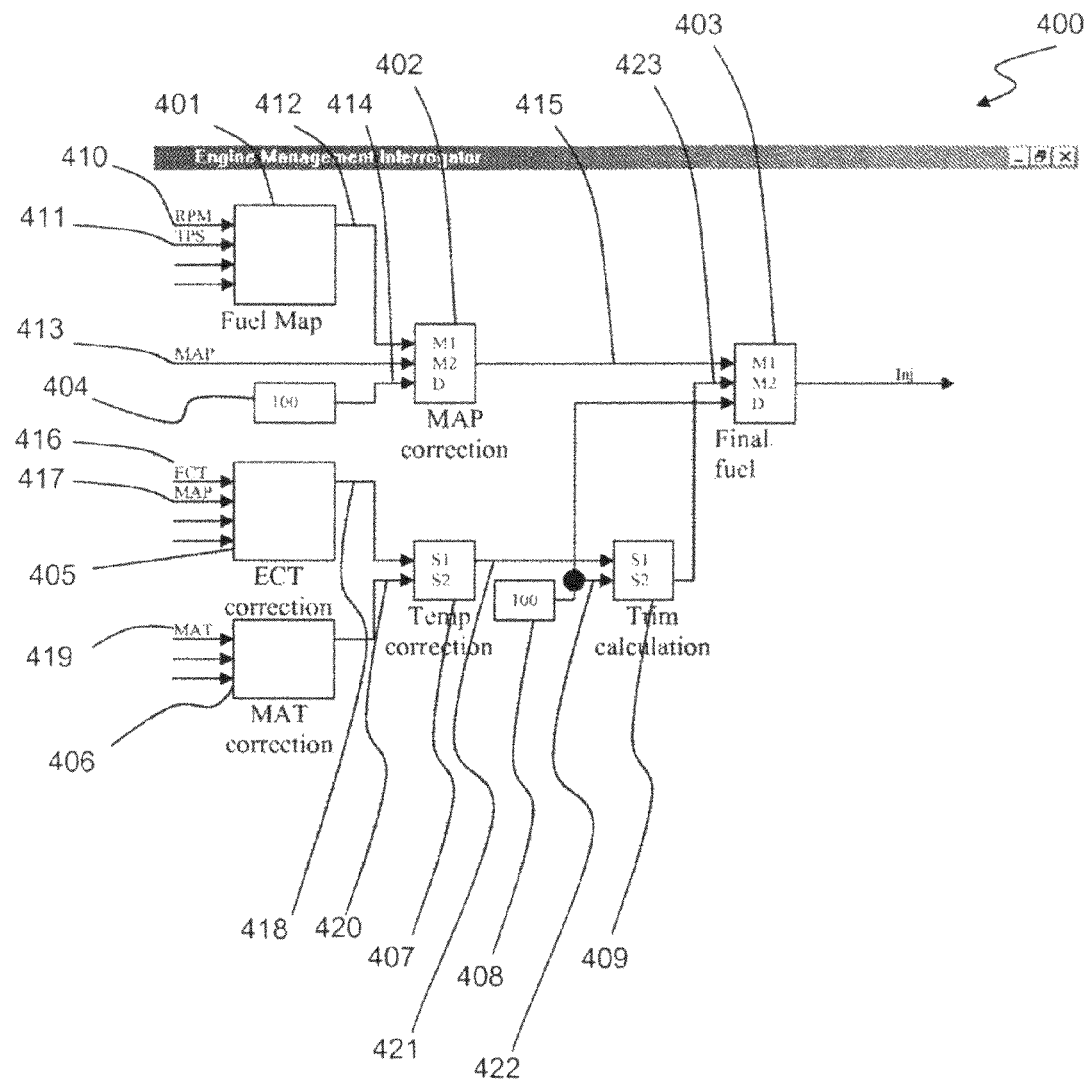
FIG. 4 shows an example of a screen displayed on the display of the user interface of FIG. 2.

The user interface 114 allows a user to graphically see and modify the functional elements defining the arithmetical and logical operations to be performed by the engine control system 100. A graphical representation of the functional elements may be displayed on the display 214 and a user may modify the functional elements using, for example, the keyboard 202 and mouse 203. Each functional element may be graphically represented on the display 214 as a "block" or similar graphical representation. For example, FIG. 4 shows an example of a screen 400 displayed on the display 214 of the user interface 114. The screen 400 includes an arrangement of nine blocks 401 to 409 each representing a particular functional element which will be described below.

For each functional element (e.g., the functional elements 401 to 409), the user may perform the following using the user interface 114:

(i) Each input of the functional element may be linked to another output of another functional element or be specified as a constant;
(ii) Two inputs of a functional element may be linked together by use of a text identifier;
(iii) Outputs of a functional element may also be identified using a text identifier;
(iv) Each functional element may also be identified using a text identifier;
(v) The graphical arrangement of the functional elements may be specified to allow configuration of the system 100 for ease of interpretation by the user;
(vi) Relative priorities of each functional element (i.e., those which must have low latency from the inputs) may be specified;
(vii) A dependency trace may be performed, to show all the inputs of the functional elements on which each output depends;
(viii) Groups of functional elements may be organised into an assembly;
(ix) The constant values within each assembly may be edited as a single unit rather than as a set of functional elements;
(x) Each block representing a functional element may be marked as being updated in realtime or not. If a block is marked as realtime, all the inputs, outputs of the block and internal states of the block are read out by the user interface 114 in real time. Any other inputs or outputs marked as realtime are also read by the user interface 114; and (xi) The configuration of the user interface 114 including positions of functional elements on the display 214 and text names are also stored in the non-volatile memory unit 102 of the engine control system 100 together with the data representing the configuration of the functional elements.

Returning to FIG. 4, the block 401 represents a type 2-D Table functional element which has been assigned the name "Fuel Map". The 2-D Table functional element 401 comprises two inputs 410 and 411. The input 410 receives a signal representing the revolutions per minute (RPM) of the engine. The input 411 receives a signal representing the position of the throttle. Based on the signals received on the inputs 410 and 411, the 2-D Table functional element 401 determines a value representing the fuel quantity for a current engine speed and throttle position at a standard atmospheric pressure of 100 kPa provided by a manifold absolute pressure (MAP) sensor. The value determined by the 2-D Table functional element (the Fuel Map) 401 is output on a connection 412.

The connection 412 connects the output of the Fuel Map 401 to an input M1 of a multiplier/divisor functional element 402. In the example of FIG. 4, the functional element 402 is given the name "MAP Correction". The multiplier/divisor functional element 402 determines a value representing the result of the product of the input M1 and another input M2 413, divided by a divisor value D. The input M2 413 receives a signal from a MAP sensor. A connection 414 connects another input D of the multiplier/divisor functional element 402 to a constant functional element 404 which generates a constant value (i.e., '100'). Based on the values of the inputs M1, M2 and D of the multiplier/divisor functional element 402, the multiplier/divisor functional element 402 determines a value representing the product of the 2-D Table functional element output 412 multiplied by the MAP value 413, divided by the constant '100'. The value determined by the multiplier/divisor functional element 402 is known as the "MAP Corrected Fuel Map value" and is output on a connection 415. The connection 415 connects the output of the multiplier/divisor functional element 402 to an input M1 of a multiplier/divisor functional element 403 which will be described below.

The block 405 represents a 2-D Table functional element which, in the example of FIG. 4, has been assigned the name "ECT Correction". The 2-D Table functional element 405 includes two inputs 416 and 417. The input 416 receives a signal from an Engine Coolant Temperature (ECT) sensor 405 and the input 417 receives a signal from the MAP sensor. Based on the inputs 416 and 417, the 2-D Table functional element 405 determines a value representing required fuel trim due to coolant temperature and engine load. The value determined by the 2-D Table functional element 405 represents a contribution made to the fuel trim value from the ECT and the manifold absolute pressure. The value determined by the 2-D Table functional element 405 may be used to allow a ratiometric additional fuel quantity to be admitted to the engine when the engine is cold, in order to compensate for fuel condensation that occurs at low temperature. The value determined by the 2-D Table functional element 405 is output on a connection 418. The connection 418 connects the output of the 2-D Table functional element 405 to an input S1 of a summer functional element 407.

The block 406 represents a 1-D Table functional element which has been assigned the name "MAT Correction". The 1-D Table functional element 406 includes an input 419 which receives a signal from a MAT sensor. Based on the input 419, the MAT correction functional element 406 determines a value representing ratiometric additional fuel quantity to be admitted to the engine in order to compensate for any intake air density change with temperature. The value determined by the 1-D Table functional element 406 is output on a connection 420. The connection 420 connects the output of the 1-D Table functional element 406 to an input S2 of the summer functional element 407.

The summer functional element 407, which in the example of FIG. 4 has been assigned the name "Temperature Correction", determines a value representing the sum of the two values on the connections 418 and 420. The value determined by the summer functional element 407 is output on a connection 421 and is referred to as the "trim" value. The trim value, represents an additional fuel quantity. For example, a trim value of ten (10) corresponds to an additional fuel quantity of 10% (to 110% of a nominal fuel quantity value). A trim value of minus five (−5) corresponds to a reduction in fuel quantity of 5% (to 95% of the fuel quantity nominal value). The connection 421 connects the output of the summer functional element 407 to an input S1 of a second summer functional element 409.

The summer functional element 409 also includes an input S2 which receives a constant value (i.e., "100") from another constant functional element 408, via a connection 422. The connection 422 also connects the constant functional element 408 to the multiplier/divisor functional element 403.

Based on the values on the connections 421 and 422, the summer functional element 409 determines a value representing the trim value plus one hundred. For example, a trim value of +10% results in a value of one hundred and ten (110) at the output of the summer functional element 409. The value determined by the summer functional element 409 is output on a connection 423. The connection 423 connects the output of the summer functional element 409 to an input M2 of the multiplier/divisor functional element 403. The multiplier/divisor functional element 403 also receives the constant value from the constant functional element 422 via the connection 422.

Based on the values on the connections 415, 422 and 423, the multiplier/divisor functional element 403 determines a value representing a corrected fuel map value. Accordingly, the corrected fuel map value is dependent on the engine speed RPM input 410, the throttle position input 411 and the MAP value 413, with corrections being applied based on the ECT as determined from engine coolant temperature 416 and MAP value 417, and the manifold air temperature (MAT) determined from the MAT value 419. The value determined by the multiplier/divisor functional element 403 is the overall injection duration (or fuel quantity) delivered to fuel injectors of the engine.

In addition to the functions described above, the processor 205 of the user interface 114 may execute a "simulator" software application program to simulate operation of the engine control system 100 based on knowledge of the configuration of the functional elements. The inputs to the simulator software application program, which in a non-simulation environment originate from the sensors of the engine, can be read from engine data pre-stored in a simulation input file (e.g., a text file or spreadsheet) stored in the memory 210, or be driven in real-time by the user using proportional controls displayed on the display 214. Windows™ "Sliders" may be used to implement such proportional controls. The element interpreter 103 may be simulated by the simulator software application program. The values output from the simulation are shown in real-time, as would be the case if the software were connected to a real engine control system. These outputs can also be logged to a file stored in memory 206. During this simulation, the high speed datalogger 116 and realtime outputs are not simulated. Only the elements of the engine control system 100 are simulated in their configuration.

The user interface 114 may also log realtime data from the engine control system 100, without using any of the datalogging features within the engine control system 100. The data from the high speed datalogger 116 may be displayed on the display 214 in real time. In the system 100 of FIG. 1, five hundred data samples may be split into twenty (20) divisions of twenty-five (25) samples each. The maximum sample rate may be set at a predetermined value, such as 25 MHz. In this instance, the minimum timebase is one (1) µs per division. The minimum sample rate may be set to another predetermined value such as 25 Hz, which corresponds to one (1) second per division. This high-speed data can be captured and logged to a file resident on the hard disk drive 210 or the memory 206.

The external low speed datalogger interface 112 may be implemented as a Flash memory device. The Flash memory device may be one of a conventional secure digital (SD) card, a USB memory stick, a compact flash (CF) card, or any similar device. This allows any selected functional element outputs to be logged to a non-volatile storage medium for later analysis. The logging of data is preferably performed by the microcontroller 101.

The low speed datalogger 113 may also be implemented as a Flash memory device such as those described above. Data is logged to the low speed datalogger 113 in the same way as the low speed datalogger interface 112. The low speed datalogger 113 is written to directly from the microcontroller 101, at a variable rate from once per second to twenty times per second. The Flash memory used to implement the datalogger 113 may be a five hundred and twelve (512) kB serial device, arranged as a circular buffer. The user interface 114 allows the user to specify which values are recorded, the sample rate, and whether logging is disabled or enabled. When logging, the data are recorded in a circular buffer so that at any time, the most recent logs can be retrieved. Alternative implementations could include other sample rates, or a linear logging storage method that starts at the beginning of logging memory and stops when the end is reached, rather than a circular buffer.

The serial data port 104 allows communication between the microcontroller 101 and the processor 205 of the user interface 114. The microcontroller 101 allows the data to be transferred between the element interpreter 103, the memory unit 102, the low and high speed dataloggers 112 and 116, and the user interface 114. As described above, the serial data port 104 affords serial connectivity and is preferably implemented according to the USB standards having a corresponding USB connector. Alternatively, the serial data port 104 may be implemented as an RS232 connection. Data may also be output from the engine control system 100 according to the control area network (CAN) specification to interface to other devices.

The serial data port 104 implemented as an RS232 connector allows RS232 communication at fifty-seven thousand six hundred (57600) baud allowing communication with standalone user interfaces. Alternative arrangements may use different serial bit rates. In one arrangement, the serial data port 104 uses a USB connection comprising a USB to serial converter integrated circuit called a CP2102. In this instance, the serial connection between the CP2102 and the microcontroller 101 uses a high bit rate such as, for example, five hundred (500) kbps. In another arrangement, the serial data port 104 uses a USB to serial converter integrated circuit called an FTDI Vinculum Chip. It should be appreciated that any other suitable USB to serial converter integrated circuit could also be used.

The serial data port 104 may be used in conjunction with the user interface 114 to perform the following functions:
Reprogramming the firmware in the microcontroller 101;
Reprogramming the configuration of the element interpreter 103 which may be implemented as an FPGA;
Modifying the functional elements;
Changing connections between the functional elements;
Assigning one or more inputs and outputs of the engine control system 100 to one or more of the functional elements as represented by the graphical representations;
Changing links between the functional elements;
Reading out the configuration of the functional elements;
Reading out the inputs, outputs and internal states of each functional element within the element interpreter 103 in realtime;
Configuring the settings of the other functional elements in the system 100, including the datalogging parameters and knock sensor inputs 108; and
Reading out the logged data from the low speed datalogger 113 and high speed datalogger 116.

The inbuilt high speed datalogger 116 allows high speed signals to be monitored and interpreted. Each sample is of a predetermined number of bits wide, such as thirty-two (32) bits or sixty-four (64) bits wide. In this instance, each sample can include four sixteen (16) bit numerical values or two thirty-two (32) bit numerical values. In another embodiment, each sample can include four thirty-two (32) bit numerical values (i.e. 128 bits wide). The datalogger 116 is triggered by the numerical values, with selectable edge sensitivity and delay. Normal, automatic and single trigger modes are selectable. The datalogger 116 has a logging memory which may store any required number of functional elements (e.g., five hundred (500) elements). The sample rate of the datalogger 116 can be up to a predetermined value, such as twenty-five (25) MHz, and down to another predetermined value, such as twenty-five (25) Hz. Data is stored within the internal memory of the element interpreter 103. However, in other arrangements data may be buffered in a separate high-speed RAM unit.

The twenty-five (25) MHz sampling rate is based on division of a twenty-five (25) MHz clock. Some possible divisors are given below:

| Divisor | Sample Rate | Timebase |
|---------|-------------|----------|
| 1 | 25 MHz | 1 µs/division |
| 2 | 12.5 MHz | 2 µs/division |
| 5 | 5 MHz | 5 µs/division |
| 10 | 2.5 MHz | 10 µs/division |
| 500 000 | 50 Hz | 500 ms/division |
| 1 000 000 | 25 Hz | 1 s/division |

Each of the inputs 106, 107, 108, 109, 110 and 111 may be connected to any value within the element interpreter 103, as well as a number of realtime inputs 109 and 111 and outputs, such as:
Digital realtime inputs, pre and post filtering;
Arm and zero crossing detection of reluctor inputs;
Injector outputs (e.g., drive signal which stays on during injector pulse)
Injector outputs (current detection signal);

Injector outputs (main transistor drive which pulses on and off); and

Ignition outputs.

A twenty-five (25) MHz sampling rate and connectivity of the inputs to the element interpreter 103 provides a built-in oscilloscope functionality which allows:

High speed signal diagnosis (e.g., ignition outputs and trigger inputs);

Medium speed control policy testing (e.g., measuring latency between a change in throttle position and a change in MAP signal, or an asynchronous fuel injection pulse); and Low speed control policy testing (e.g., closed loop controllers for idle speed, variable valve timing or fuel delivery).

There may be any number of auxiliary output drivers 117. In one arrangement, there are eight auxiliary output drivers 117. The drivers have the following features:

Ability to sink or source current;

Current limiting per channel on sinking or sourcing sides;

Output can be taken above the supply when the system 100 is not powered up; and Each output can be a pulse width modulated value or a Boolean value.

Alternative arrangements may not include the high side driver, or may not include the current limiting described above.

In one arrangement, there are eight ignition drivers 118. Each driver has the following features:

Each ignition driver output may have its sense positive or negative. Positive sense refers to the output of the engine control system 100 being high during the coil drive duration (i.e., dwell period), and low during the coil off period. The spark is generated on the high-low transition. Negative sense is the logical inverse of this.

Each ignition driver output may be configured as one of the following types:
 finish angle and dwell time;
 finish angle and dwell angle;
 start angle and dwell time;
 start angle and dwell angle;

Each ignition driver output may be configured to have a minimum off time for spark duration, with an output that comes on when the dwell time is reduced for this reason;

Each ignition driver output may be configured as to which cylinders in the cycle on which the output is active; and Each output may be swapped between the functionality of an ignition output or a conventional auxiliary output.

Alternative arrangements may dispense with some of the above ignition driver output features.

In one arrangement, the hardware for the ignition driver outputs is a four hundred and seventy (470) Ohm pull-up resistor to a twelve (12) Volt supply. In this instance, the output is shorted to ground with an open collector output. A series one hundred (100) Ohm resistor provides some current limiting in case the output becomes shorted to twelve (12) Volts due to poor installation.

When an ignition driver is used as an auxiliary output, the output is still the same hardware, which means that when the output is high, the output measures as twelve (12) Volts in series with five hundred and seventy (570) Ohms, and when the output is low the output measures as zero (0) Volts in series with one-hundred (100) Ohms.

The injector outputs 119 are the same as the ignition outputs 118 with the following exceptions:

The output is inverted and is held low during the charge time (i.e., on time);

The duration may be a fixed injection time, rather than dwell time or angle;

The output may be configured for peak/hold or constant current; and

An overall current selection may be made.

Each hardware injector channel is a current controlled, switching mode output. During the charge phase, the injector output is pulled to ground using a power MOSFET. During this phase, the current is sensed using a low value resistor between the MOSFET source and ground. When the voltage across the resistor reaches a predetermined value, corresponding to the selected injector current, the switching transistor switches off. The injector discharges through another MOSFET via a Schottky diode back into the twelve (12) Volt supply. The current is not measured during this phase. After a programmable duration, the main switching MOSFET is turned on again, until the sensed current again reaches the set value. When the injection duration is finished, both MOSFETs are switched off, and the injector discharges into a high voltage to allow the current to rapidly extinguish. The output MOSFETs are protected by an active Zener clamp integrated within the low-side drive MOSFET.

Alternative arrangements may include a linear type current source rather than a switching mode type, or saturated open collector or open drain outputs only rather than current sources.

If a peak-hold output is selected, then a resistive divider is used to divide the current sensed by four point three (4.3), achieving the effect of multiplying the current setpoint by four point three (4.3).

When an injector driver is selected as an auxiliary output, the overcurrent sensing can be nominated as either:

The same as the injector current setpoint;

Four point three (4.3) times the injector current setpoint which is the same as the peak injector current; and Disabled The current sourcing functionality, which is present on the auxiliary outputs 117, is not present on the injector drivers when used as an auxiliary output.

The engine control system 100 has a headphone output 115 which provides an audio signal to the user and/or the operator. These audio signals may be audio queues to the user and/or the operator. The headphone output 115 may be used to listen to knock signals from engine knock sensors. In one embodiment, the headphone output 115 allows the following functions:

Knock sensor one (1) (raw) in left channel, Knock sensor two (2) (raw) in right channel;

Knock sensor one (1) (processed) in left channel, Knock sensor two (2) (processed) in right channel;

Knock sensor one (1) (raw) in both channels;

Knock sensor one (1) (processed) in both channels;

Knock sensor two (2) (raw) in both channels; and

Knock sensor two (2) (processed) in both channels.

In another embodiment, the headphone output 115 is single channel (mono) only and thus only allows the following functions:

Knock sensor one (1) (raw);

Knock sensor two (2) (raw);

Knock sensor one (1) (processed); and

Knock sensor two (2) (processed).

In addition to the above options, a headphone output module (not shown) within the element interpreter 103 allows an audible alarm signal to be generated, which can be driven as any other functional element.

A method 300 of configuring the engine control system 100 for use in controlling the engine of a vehicle. The method 300 may be implemented as software resident on the memory unit 102 and being controlled in its execution by the microcontroller 101.

The method 300 begins at step 301, where the microcontroller 101 displays one or more graphical representations of the functional elements each defining one or more arithmetic or logical operations to be performed by the engine control system 100. For example, the microcontroller 101 may display the screen 400 as seen in FIG. 4.

The microcontroller 101 passes communications between the memory unit 102 and the RAM 105, via the element interpreter 103. The microcontroller 101 also passes data from the element interpreter 103 to the processor 205. Accordingly, as the engine is continuously operating and one or more parameters and/or inputs/outputs to the functional elements change (e.g., a temperature sensor detects a change in temperature), these changes are interpreted by the element interpreter 103. The changes are then passed by the microcontroller 101 to the processor 205 so that the displayed graphical representations may be updated on the display 214 based on the changes.

The method 300 continues at the next step 303, where one or more of the functional elements are modified by a user using the user interface 114. The modifications to the functional elements may be made by making changes to the displayed graphical representations in order to configure the engine control system 100, in the manner described above.

INDUSTRIAL APPLICABILITY

It is apparent from the above that the arrangements described are applicable to the automotive, computer and data processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The claims defining the invention are as follows:

1. A method of configuring an engine control system for controlling the engine of a vehicle, comprising:
    displaying graphical representations of at least two functional elements; and
    modifying the at least two functional elements by making changes to the displayed graphical representations in order to configure the engine control system;
    wherein:
    each of the at least two functional element comprises one or more arithmetic or logical operations to be performed by the engine control system;
    each of the at least two functional elements comprise a proportional-integral-derivative controller; and
    the modifications further comprise changing connections between the graphical representations of at least two functional elements.

2. The method according to claim 1, wherein the modifications are made during continuous operation of the engine.

3. The method according to claim 1, wherein the modifications further comprise assigning one or more inputs and outputs of the engine control system to one or more of the graphical representations.

4. The method according to claim 1, wherein the modifications further comprise changing links between the functional elements.

5. The method according to claim 1, further comprising simulating operation of the engine control system based on pre-stored engine data.

6. The method according to claim 1, wherein the engine control system provides audio cues to a user during the modification of the functional elements.

7. The method according to claim 1, wherein the engine control system provides audio feedback of as to a current state of engine behaviour.

8. The method according to claim 7, wherein the audio feedback represents knocking sounds generated by the engine of the vehicle.

9. An engine control system configured in accordance with the method of claim 1.

10. An apparatus for configuring an engine control system for use in controlling the engine of a vehicle, comprising:
    a display for displaying graphical representations of at least two-functional elements; and
    a processor for making modifications comprising-modifying of the at least two functional elements by making changes to the displayed graphical representations in order to configure the engine control system;
    wherein:
    each of the at least two functional element comprises one or more arithmetic or logical operations to be performed by the engine control system;
    each of the at least two functional elements comprise a proportional-integral-derivative controller; and
    the modifications further comprise changing connections between the graphical representations of at least two functional elements.

11. A computer readable medium, having a program recorded thereon, where the program is configured to make a computer execute a procedure to configure an engine control system for use in controlling the engine of a vehicle, said program comprising:
    a code for displaying graphical representations of at least two functional elements; and
    a code for making modifications including modifying the at least two of the functional elements by making changes to the displayed graphical representations in order to configure the engine control system;
    wherein
    each of the at least two functional element comprises one or more arithmetic or logical operations to be performed by the engine control system;
    each of the at least two functional elements comprise a proportional-integral-derivative controller; and
    the modifications further comprise changing connections between the graphical representations of at least two functional elements.

12. An engine control system for controlling the engine of a vehicle, said engine control system comprising:
    a memory for storing at least two functional elements; and
    a processor for executing the at least two functional elements to control the engine, wherein the at least two functional elements are modifiable by modifications comprising making changes to displayed graphical representations of the at least two functional elements while the engine is operating, and wherein:
    each of the at least two functional element comprises one or more arithmetic or logical operations to be performed by the engine control system;

each of the at least two functional elements comprise a proportional-integral-derivative controller; and the modifications further comprise changing connections between the graphical representations of at least two functional elements.

\* \* \* \* \*